J. GROSSMANN.
TREATMENT OF SEWAGE SLUDGE.
APPLICATION FILED JULY 15, 1909.
1,025,622.
Patented May 7, 1912.
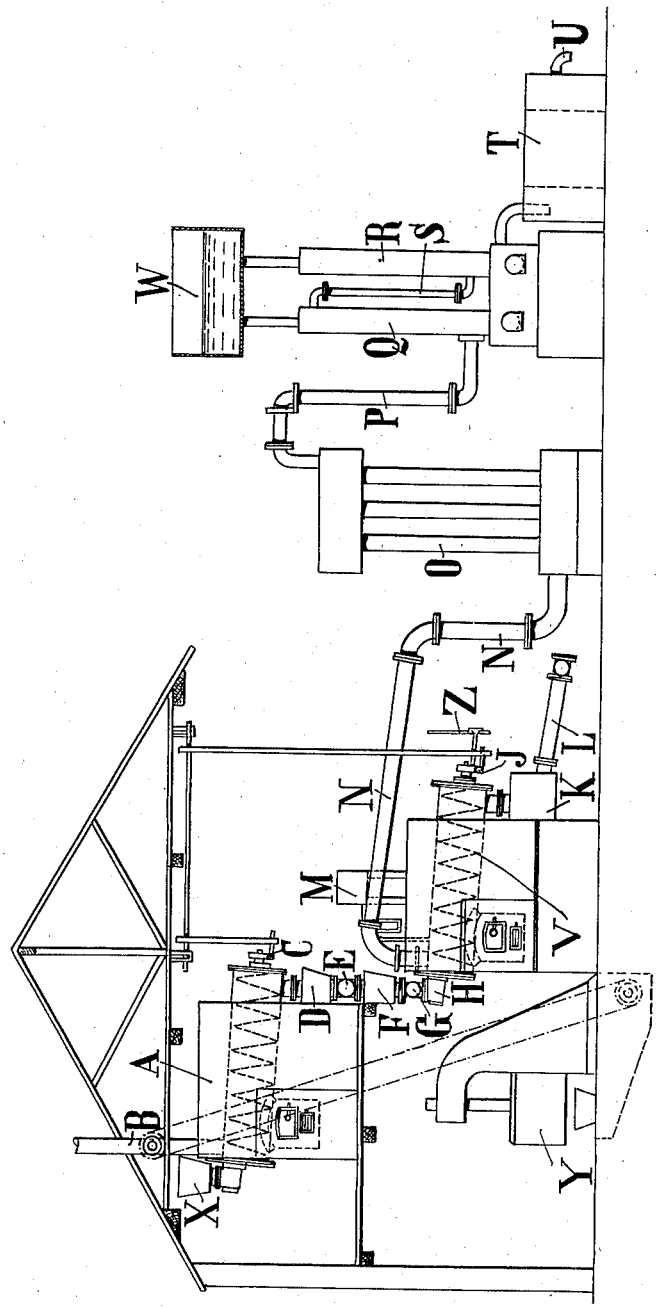

UNITED STATES PATENT OFFICE.

JACOB GROSSMANN, OF MANCHESTER, ENGLAND.

TREATMENT OF SEWAGE-SLUDGE.

1,025,622.     Specification of Letters Patent.     Patented May 7, 1912.

Application filed July 15, 1909. Serial No. 507,699.

*To all whom it may concern:*

Be it known that I, JACOB GROSSMANN, citizen of Great Britain, residing at the city of Manchester, England, have invented new and useful Improvements in the Treatment of Sewage-Sludge, of which the following is a specification.

The precipitate which is obtained when sewage either as such or after treatment with precipitants is allowed to settle is termed "sludge." After the supernatant liquor has been removed from it by decantation, pumping, or other means, it contains from 80% to 90% of water, and fat, grease, soap, and other fatty compounds, nitrogenous and other organic matter, and inorganic substances.

The ultimate object of my invention is to obtain from the sludge the maximum amount of fatty acids and other fatty matter, and other products of distillation by means of superheated steam, as well as a fixed residue of manurial properties and of the highest value. For these purposes I proceed as follows:—The sludge is in the first instance freed from water as far as this can be done by mechanical means. Up to the present this has been mostly effected by filter presses, but it has been found that in many instances it is difficult to obtain a cake of sufficient concentration without the addition of lime, owing to the slimy nature of the sludge. As the addition of lime necessitates the use of an equivalent quantity of sulfuric acid in subsequent operations I preferably use centrifugal force for desiccating the sludge. The cake thus obtained and which may contain 50% of solids, or more or less, is dried further by heat in a suitable apparatus. The dried sludge which, however, need not have been freed completely of its moisture, but which should be in a sufficiently dry state to contain no large lumps is conveyed to an apparatus in which it is mixed with sulfuric acid of suitable strength. The strength of the acid may vary from 150° Twaddell or less to 170° Twaddell, and depends on the moisture left in the cake after drying, so that after mixing any free sulfuric acid present in the cake should not be of sufficient dilution to attack the iron of the apparatus used in this and subsequent operations. The quantity of acid used must be sufficient to substantially prevent the liberation of ammonia from the nitrogenous matter, but need not be necessarily large enough to liberate the total amount of the fatty acids from the combinations in which they are present in the sludge. In the case of sewage having its origin chiefly from domestic sources I have found that the addition of from five to seven parts of sulfuric acid to every 100 parts of dry sludge gives in some instances satisfactory results. It will, however, be best to ascertain the most suitable proportions by experiments, either in a small experimental plant, or by working charges of different proportions of sludge and acid in a proper complete plant, and note which proportion gives the best results, as regards quantity and quality of grease and manure obtained.

The mixture of dried sludge and sulfuric acid is now conveyed into the retort proper in which by means of superheated steam grease and fatty acids are driven off. Many attempts have been made to perform this operation satisfactorily, but up to the present they have failed, chiefly owing to the peculiar mechanical and physical properties of sewage sludge. I have, however, found that the difficulties can be overcome in the following manner: I use an apparatus which broadly speaking consists of a horizontal cylinder closed at either end, preferably made of cast iron, and fitted with a suitable opening for charging the sludge mixture, and another opening at the opposite end for discharging the manurial residue, also with an outlet at the top through which the products of distillation along with steam are taken to the condensers. The horizontal cylinder is fitted with a center shaft on which are fixed arms or paddles, which, when the shaft is made to revolve cause the sludge to be broken up and thoroughly mixed. Steam pipes are fixed at a convenient place and through these superheated steam is passed into the retort while the shaft and the arms are revolving. The retort is heated externally to such a temperature as will compensate the loss from radiation, evaporation and other sources, and which, while being low enough to prevent the decomposition of the fat by destructive distillation, is yet high enough to prevent the steam from condensing. Preferably I use for a retort an apparatus in which the mass it contains is not only heated by external heat, but in which the shaft and paddles are hollow, and the steam passing through these and issuing from perforations at the ends of the paddles provides internal heat and insures a thorough mixing of the steam with the material. If it is desirable to work intermittently, the agitating arms are fixed at a right angle to the shaft and the retort may be placed level; a charge of convenient weight being placed in the retort, the material may be agitated and subjected to the action of steam for a sufficient period, and the residue discharged after all the grease has been distilled off. If, however, as is more convenient in most cases, it is desirable to work continuously, the retort may be bricked in at a suitable angle so as to be higher at the charging end than at the discharging end; or the agitator or paddle arms, instead of being at a right angle to the shaft, may be fixed at such an angle as to produce a screw-like motion in the direction from the charging to the discharging end, in which case the retort may be placed level. The respective angles can be easily calculated according to the speed at which it is desired to work, in a manner well known to engineers.

The arrangements for charging and discharging are such as to practically prevent access of air. The apparatus for mixing the sludge with sulfuric acid may be arranged so as to act as the feeder for the distilling retort; or the retort may be made correspondingly longer and the first part of it used for mixing the dry sludge with sulfuric acid. In either case, in continuous work, the acid is run on to the dried sludge, near the feeding place, in a thin stream in the proper proportion. In some cases, particularly where the sludge cake may be obtained in an exceptionally concentrated form from the filter press or the centrifugal machine, the drying, mixing with sulfuric acid, and distilling of the sludge, may be performed in one and the same retort and which is heated externally, in such a way that the first part of the retort acts as an agitator for drying, the second as an agitator for mixing with acid, and the third as a distilling retort, as described above.

The gaseous and volatile products of distillation consisting of steam, and fatty and other substances, and of dust which is mechanically carried forward from the manurial residue are passed through pipes or other suitable vessels which are preferably kept at a temperature of about 100 degress centigrade in order to allow the dust to settle out. They then go through a condensing apparatus which may consist of a number of pipes which are cooled externally by air or water, and then through towers in which the cooling water is mixed with the steam and products of distillation in sufficient quantity to condense them. The condensing water being allowed to settle will separate the grease on the top and the water after cooling may be used again for condensing purposes in the condensing tower. In this manner substances other than fat which are produced in the process of distillation, will become gradually concentrated and suitable for recovery. The crude grease obtained may be purified by remelting or by the action of suitable chemicals, or in any other known manner.

The residue which contains nitrogen, potash, phosphates and a large amount of organic matter, and which thus is valuable both as soil and as manure may be rendered more suitable for different purposes by being mixed with nitrates, potash, salts, lime or lime compounds, ammonia salts, phosphates and the like in a manner well known to agricultural chemists.

The distillation may be craried out under a slight vacuum, in most cases, however, it may be performed without a vacuum pump, or it may even be done at a pressure slightly above that of the atmosphere.

The external heat supplied to the retort may be transmitted by direct firing, waste heat, steam, water, sand or a combination of either of these, or any other known means and the temperature of the retort body thus be kept at about 120° to 150° C. or below or above; the superheated steam may have a temperature of from 250° C. to 300° C. or below or above; the respective heats of retort body and superheated steam depend on each other, on the nature of the sludge, and the speed of agitation, and the best conditions of heat and working speed should be ascertained in each case by trials. The drying of the sludge cake by heat may be carried out by any of the known means, either with or without access of air. Preferably I use an apparatus which allows of the volatile products given off being condensed.

The particular form of the apparatus by which I carry out my process is unimportant, provided it enables conditions such as those above defined to be attained.

In the accompanying sheet of drawing I have illustrated schematically an apparatus well adapted to the purpose, and in the drawing Y is a centrifugal machine of any suitable construction in which the sludge is mechanically desiccated.

A is the drying apparatus, consisting of a retort which is heated, and in which the pressed sludge is fed in at X, and is gradually moved by internal paddles geared from C in that direction.

B. is a pipe, from which the vapor escapes. The dried sludge passes through the hopper D into the valve E. From the valve E it passes to the hopper F, from F to the valve G and through H into the distillation retort V.

M is a box containing sulfuric acid, and connected with the retort in such manner as to allow a continuous or intermittent flow of acid into the retort. The superheated steam enters the retort V through the pipe Z at a convenient point. The retort is heated preferably by waste heat. The mass in the retort V is also moved by internal paddles, geared from J, in that direction and passes into the box K; from there into the cooling pipe L, from which it is discharged into receptacles. The superfluous steam and liberated fat pass through the pipe N into the air condenser O, and from there through the pipe P, through the cooling pipes Q and R, which are connected with each other by the pipe S. Water is passed through the towers Q and R from the cistern W. The cooling water and the condensed steam are then run through the tank T, in which the fat is separated at the top, and from which the superfluous water is discharged through U.

Instead of adding the sulfuric acid as described above, part of it or all may be added at any of the previous stages. If precipitants have been used in the course of the preliminary treatment of the sewage, or if the sludge has been mixed with lime or other substances which facilitate filter-pressing such as sulfate or phosphate of lime, basic slag or the like the quantity of acid used must be where necessary increased. Instead of sulfuric acid, phosphoric acid or superphosphates, acid sulfates of lime or of the alkalis, or other similar compounds may be used.

The speed at which the agitating arms and paddles of the retort travel may be at the rate of ten feet per minute or more or less. As stated before, the speed, the heat of the retort, and the heat of the superheated steam are substantially functions of the total result aimed at, and may be varied accordingly and I, therefore, do not bind myself to their individual figures as given above.

Having now particularly described and ascertained the nature of my said invention, and in what manner the same is to be performed, I declare that what I claim is:—

1. The herein described method of treating sewage sludge, which consists in desiccating the same mechanically, then drying the product to a suitable consistency, then mixing the dried sludge with a suitable quantity of sulfuric acid, then subjecting the resulting mixture to the simultaneous action of superheated steam and to agitation, then condensing the steam and volatilized products of distillation and finally separating the fatty acids and grease from the products of condensation.

2. The herein described method of treating sewage sludge which consists in desiccating the same by centrifugal force without the use of lime, then subjecting the product to heat to dry or partially dry the same, then mixing the dried sludge with sulfuric acid, then passing the resulting mixture through an internally and externally heated retort, subjecting the mixture in the retort to the action of superheated steam and agitation, then condensing the steam and volatilized products of distillation, and finally separating the fatty acids and grease from the products of condensation.

In testimony whereof I have signed my name to this specification in the presence of two subscribing witnesses.

JACOB GROSSMANN.

Witnesses:
 THOMAS A. ANDRUS,
 EDWIN H. KERSLEY.